No. 686,153. Patented Nov. 5, 1901.
W. SMITH.
ROOT HOOK.
(Application filed Mar. 22, 1901.)
(No Model.)
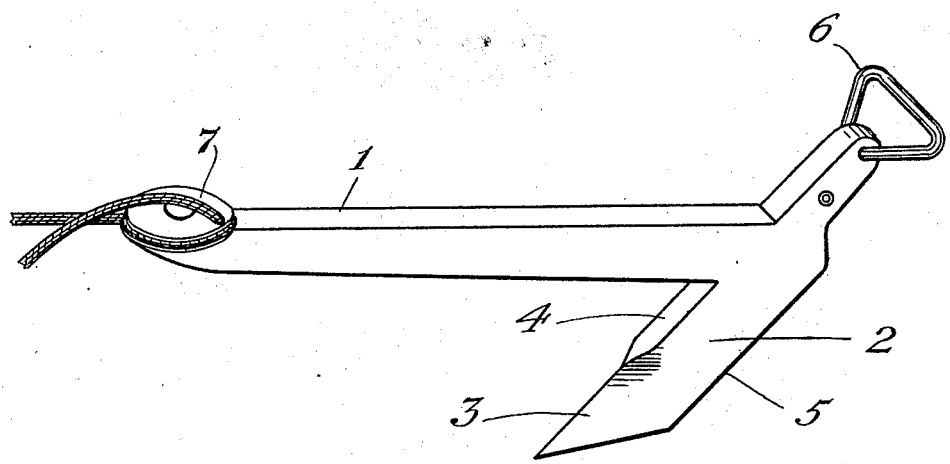
Witnesses
Theo. Lagaard
M. F. Harrison.
Inventor
William Smith
By P. V. Gunckel
his Attorney.

UNITED STATES PATENT OFFICE.

WILLIAM SMITH, OF LA CRESCENT, MINNESOTA.

ROOT-HOOK.

SPECIFICATION forming part of Letters Patent No. 686,153, dated November 5, 1901.

Application filed March 22, 1901. Serial No. 52,277. (No model.)

*To all whom it may concern:*

Be it known that I, WILLIAM SMITH, a citizen of the United States, residing at La Crescent, in the county of Houston and State of Minnesota, have invented certain new and useful Improvements in Root-Hooks, of which the following is a specification.

My invention relates to devices for extracting roots. Such hooks are usually made double-pointed for the purpose of engaging the root on the points of the hook; but in practice it is found difficult to keep the hooks from slipping off the root. Another objection is that the double-pointed hook cannot enter the ground until considerable digging has first been done to set the points of the hook in position to engage the root, and still another objection to such hooks is that when the points only are engaged the bend of the hook is subjected to too much strain, and if the bend is made strong enough to withstand the strain the implement is made too heavy to be handled conveniently.

It is the object of my improvement to provide a comparatively light but sufficiently-strong hook for practical use and to adapt it to receive the root in the bend of the hook instead of on the point when in use. To this end I employ a strong short stub-hook set at an acute angle to the draft-beam to catch and hold the root, and from the lower end of the stub-hook extends a sharp blade, which readily enters the ground without previous digging until the root is caught and held in the stub-hook close to the beam, thereby throwing the whole strain directly on the beam.

My improvements are illustrated in the accompanying drawing, in which the figure is a perspective view of a root-hook embodying my improvements.

In the drawing, 1 designates a draft-beam, to which the hook 2 is secured or with which it is integrally formed. The hook itself may be a straight blade and sharp on its front edge 3 from the lower point to within a few inches of the beam, the portion 4 near the beam being made either square, oblong, or round in cross-section or of the thickness of the back of the blade, so as not to cut the root in two at that point. It is necessary that the portion near the beam called the "stub-hook" be made at an acute angle to the beam, so as to hold the root, and it is better that the sharp blade be made on an angle less acute. The back 5 of the blade may be made as thick as the stub near the beam and tapering to a point. The point and sharp blade portion are intended to penetrate the ground under the root, so that the latter will be engaged by the thick upper portion or stub-hook and will be held in the angle of the hook between the beam and the blade portion of the hook.

The hook being formed at a suitable forward inclination to the beam, the resistance of the root will fall direct on the beam instead of on the points of the hook, and a much lighter hook may be used than in the ordinary construction, where the point of the hook engages the root. The sharp blade portion leads down into the ground without digging until the stub-hook catches a root, when the blade portion steadies the hook and prevents its slipping off the root.

A handle 6 may be provided in the rear of the hook, or two handles similar to plow-handles may be attached.

The forward end of the beam may have any suitable means for attaching a source of power.

I have shown a rope-grab 7 for connecting to any portion of a pull-rope by having one portion of the pull-rope overlap another in a well-known manner.

A root-hook of the construction described may be comparatively light and easily handled and will serve its purpose efficiently.

Having described my invention, what I claim, and wish to secure by Letters Patent, is—

1. A root-hook comprising a draft-beam, a relatively thick stub portion arranged at an acute angle next to the beam, and a relatively long and thin blade-like portion extending from such stub, substantially as set forth.

2. A root-hook having a thick portion next to the draft-beam and a blade portion extending from the thick portion to the point, substantially as set forth.

In testimony whereof I have hereunto set my hand this 18th day of February, 1901.

WILLIAM SMITH.

In presence of—
 WALTER C. WINTER,
 FRANK WINTER.